United States Patent [19]
Alfenaar et al.

[11] 3,947,419

[45] Mar. 30, 1976

[54] PREPARATION OF CYANURIC CHLORIDE

[75] Inventors: Marinus Alfenaar, Schinnen; Desiré J. N. Jadoul, Valkenburg, both of Netherlands

[73] Assignee: Stamicarbon, B.V., Geleen, Netherlands

[22] Filed: Oct. 16, 1974

[21] Appl. No.: 515,255

[30] Foreign Application Priority Data

Oct. 20, 1973 Netherlands.................... 7314467

[52] U.S. Cl............................................ 260/248 C
[51] Int. Cl.²...................................... C07D 251/28
[58] Field of Search ............................... 260/248 C

[56] References Cited
UNITED STATES PATENTS 2,762,798   9/1956   Hardwicke et al................ 260/248
3,257,169   6/1966   Sprague............................... 23/190

FOREIGN PATENTS OR APPLICATIONS 491,820     7/1970   Switzerland
1,104,517   4/1961   Germany Primary Examiner—John M. Ford
Attorney, Agent, or Firm—Cushman, Darby & Cushman

[57] ABSTRACT

An improved process and apparatus for preparing cyanuric chloride by trimerizing cyanogen chloride in the presence of chlorine. The cyanogen chloride is produced by electrolytically reacting a solution of hydrogen cyanide or a salt thereof with chloride ion in an anode chamber of an electrolytic cell at a pH of less than 4.

3 Claims, 1 Drawing Figure

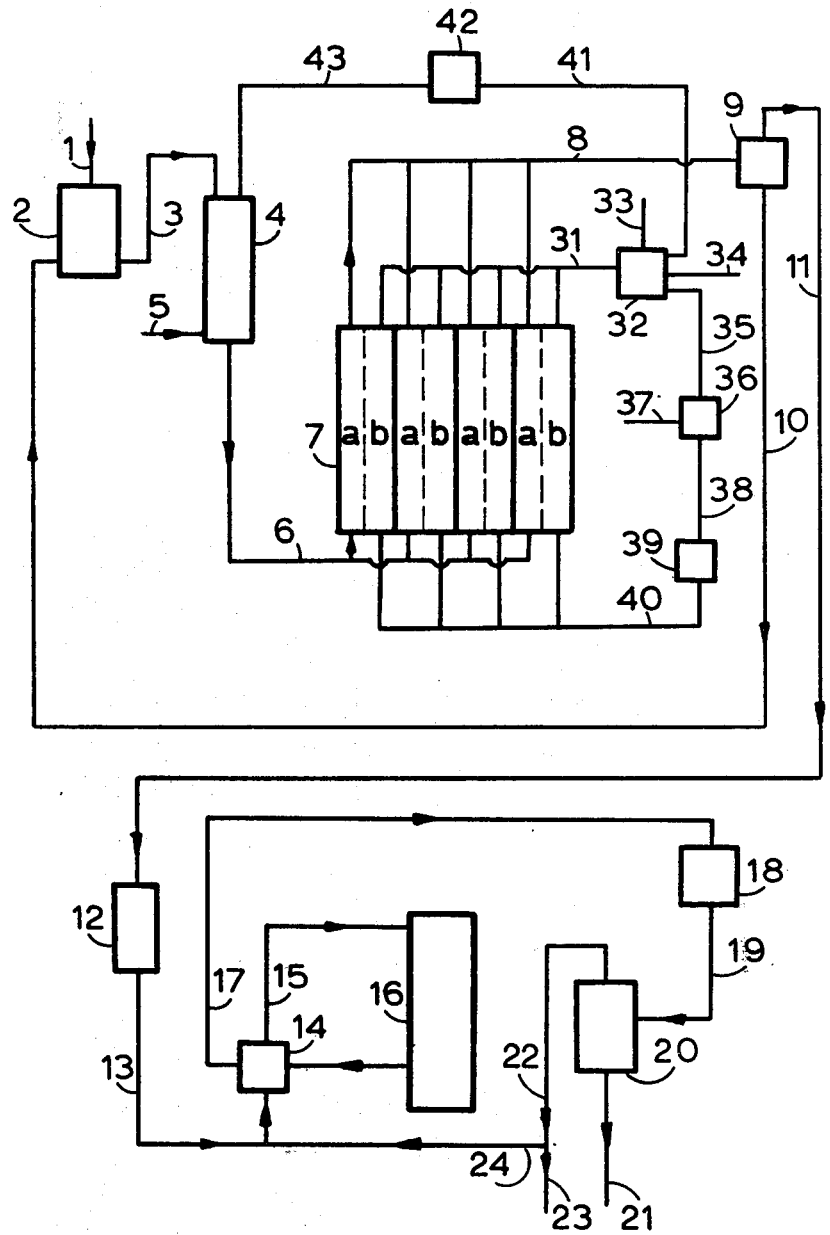

PREPARATION OF CYANURIC CHLORIDE

BACKGROUND OF THE INVENTION

This invention is directed to a process and apparatus for the preparation of cyanuric chloride by trimerizing cyanogen chloride in the presence of chlorine. A known process for the preparation of cyanuric chloride is described in Netherlands Pat. application No. 7101929. Generally, the starting mixture of cyanogen chloride and chlorine is prepared by having an excess quantity of chlorine react with hydrogen cyanide. Methods for preparing such starting mixtures are described in Netherlands Pat. application No. 6900350. This process however, suffers from the drawback that the mixture of cyanogen chloride and chlorine also contains hydrogen chloride, which can only be removed from the mixture with great difficulty. Moreover, hydrogen chloride is an undesirable by-product.

Methods are also known whereby cyanogen chloride may be prepared electro-chemically from halide ion and hydrogen cyanide as shown by U.S. Pat. No. 3,105,023. However, the cyanogen chloride produced according to this known process cannot be used for trimerization into cyanuric chloride without further refinement. The cyanogen chloride obtained according to the process of U.S. Pat. No. 3,105,023 contains contaminants which cannot be removed without great difficulty. Such contaminants would accumulate in a reaction mixture flow circulating over the trimerization reactor. This would result in a strong reduction of the reaction volume available in the trimerization reactor as well as a possible poisoning of the trimerization catalyst and probably necessitating the application of a large discharge out of the circulating flow, the latter being attended, of course, by serious losses of valuable products.

Accordingly, it is the primary object of the present invention to eliminate the drawbacks associated with such prior art processes.

It is a further object of the present invention to provide a continuous process for the production of cyanuric chloride.

SUMMARY OF THE INVENTION

Cyanuric chloride is prepared according to the present invention by reacting chloride ion and hydrogen cyanide or a salt thereof in the anode chamber of an electrolytic cell having separate cathode and anode chambers. The reaction is carried out through the use of an electric current and the solution in the anode chamber is maintained at a pH value below 4. Cyanogen chloride which is produced within the anode chamber is separated off from the electrolyzed solution, and subsequently the cyanogen chloride, mixed with chlorine, is fed to a trimerization zone wherein the cyanogen chloride is caused to trimerize. It is preferred that the electrolysis reaction of hydrogen cyanide or salt thereof with chloride ion takes place under such conditions that chlorine-containing cyanogen chloride is formed. Under conditons such as this no additional chlorine need be added to the cyanogen chloride prior to being fed to the trimerization zone.

The mixture of cyanogen chloride and chlorine leaving the electrolytic cell is free of hydrogen chloride and of other contaminants which would be detrimental during trimerization and may be directly fed to the trimerization zone, preferably after having been dried.

The process according to the present invention is thus an improved means for producing cyanuric chloride by trimerizing cyanogen chloride in the presence of chlorine by:

a. electrolytically reacting a solution of hydrogen cyanide or a salt thereof with chloride ion in the anode chamber of an electrolytic cell having separate cathode and anode chambers, the pH in said anode chamber being kept below 4 to form cyanogen chloride;
b. separating said cyanogen chloride from the electrolyzed solution;
c. preparing a mixture of said cyanogen chloride with chlorine; and
d. feeding the mixture of cyanogen chloride and chlorine to a trimerization zone wherein said cyanogen chloride is trimerized.

A further aspect of this invention includes apparatus for continuously performing the above noted process which includes:

a. an electrolytic cell having separate cathode and anode chambers;
b. feed lines in communication with said cathode and anode chambers for supply of catholyte and anolyte respectively thereto;
c. discharge lines connected to said cathode and anode chambers for removal of reaction products therefrom;
d. a separator in communication with said anode chamber for separating the mixture leaving the anode chamber(s) into a gas phase and a liquid phase;
e. a drier in communication with said separator to dry said gas phase;
f. a means for trimerizing cyanogen chloride, said means being in communication with said drier; and
g. recovery means connected to said means for trimerizing in order to recover cyanuric chloride.

As noted above, the reaction of hydrogen cyanide or a salt thereof with chloride ion in the anode chamber to produce cyanogen chloride is carried out at a pH of less than 4, and preferably in the range of from about 0.5 to 2. By effecting the electrolytic reaction of hydrogen cyanide and chloride ion at such a low pH, the formation of contaminants as noted hereinbefore is effectively suppressed. The desired pH level may be set and maintained by supplying acid to the anode chamber. A preferred acid is hydrochloric acid. Alternatively, the desired pH value in the anode chamber can be obtained without the addition of acid to the chamber by choosing a suitable membrane in conjunction with the temperature and electrolytic concentration. The membrane must be a cation-permeable membrane and the use thereof results in the formation of free acid in the anode chamber according to the anodic reaction

Hydroxyl ions which form in the cathode chamber are prevented from diffusing into the anode chamber by use of a selective cation-permeable membrane. In the absence of such a selective membrane, the hydroxyl ions formed in the cathode chamber would neutralize the acid formed in the anode chamber.

Generally, however, protons formed in the anode chamber will rapidly diffuse through the membrane to the cathode chamber where the protons are consumed through discharge. It is preferred, therefore, that the membrane have a relatively low permeability to protons, in order to maintain a concentration gradient of protons over the membrane such that the pH in the anode chamber is maintained at a level below 4. Certainly, however, the permeability of the membrane should not be so low as to cause the electro-chemical cell to exhibit a prohibitively high internal resistance.

Membranes which meet the requirements noted above are well known and commercially available such that one of ordinary skill in the art can readily choose on the basis of membrane specifications available. As previously noted, the selection of membrane will be influenced by the required reaction temperature and electrolyte concentration. Suitable membranes are e.g. thermoplastic fluorocarbon polymer films to which cation-exchanging materials are attached. Such membranes can be prepared by graft polymerizing styrene in the fluorocarbon polymer film, followed by sulfonization. One suitable selective cation-permeable membrane is commercially available under the name of AMF-C 311 from the American Machine And Foundry Company.

In a preferred embodiment of the present invention, the anode chamber is separated from the other chamber(s) in the electro-chemical cell by suitable semipermeable membranes, and in particular by a selective cation-permeable membrane. The cathode chamber may be directly adjacent to the anode chamber or an intermediate chamber may be present which is separated from the cathode chamber by selective anion-permeable membrane.

The chloride ion supplied to the anode chamber is provided by a suitable chloride salt. Such salts include alkali metal chlorides, alkaline-earth metal chlorides or ammonium chlorides (the ammonium ion being non-substituted or substituted with one or more alkyl-, cycloalkyl-, aryl-, alkaryl- and/or aralkyl-groups having at the most 10 carbon atoms in the chain). Thus, the electro-chemical cell will in addition to the hydrogen ion present in the anode compartment also contain either alkali metal ion, alkaline-earth metal ion or ammonium ion.

From the cathode chamber one recovers a metal hydroxide or substituted ammonium hydroxide as by-product, therefore, it is preferred to employ alkali metal chloride, in particular potassium chloride or sodium chloride, as starting materials rather than hydrogen chloride, alkaline-earth metal chloride or ammonium chloride. Alkaline-earth metal hydroxides have little value as by-products and, due to their low solubility may create clogging and scaling in the cathode chamber. Ammonia is not a particularly valuable by-product either.

In order that one may obtain the maximum quantity of hydroxide or ammonia from the cathode chamber, it is preferred to only supply sufficient acid to the electro-chemical cell to set and maintain the pH value below 4 in the anode chamber. A further advantage of restricting the amount of acid added to the electro-chemical cell is the reduction of the heat production in the cell to be achieved thereby. Since it is difficult to discharge heat produced from the electrolytic cell, the limiting of this heat production results in substantial technological advantages.

Thus, the quantity of acid formed in the anode chamber of the electro-chemical cell is, by preference, not larger than is necessary for maintaining the desired low pH value. The quantity of acid formed in the anode chamber can be lowered by starting from a salt of hydrocyanic acid or a mixture of hydrocyanic acid and its salt rather than from pure hydrogen cyanide. As the cation component of the salt of hydrocyanic acid the same considerations apply as for oppositely charged ion of the chloride ion. Thus alkali metal cyanide is preferred.

It is not necessary that the catholyte contain any salt, and thus both chloride and cyanide may be absent. However, in the technical embodiment of the invention process, the catholyte consists of a solution of the metal hydroxide formed as a by-product in the manner noted above.

It has been found that the suitable concentration of reactants in the anolyte ranges from between about 1 and 10 percent by weight of the cyanide (calculated as cyanide ion), and from about 3 to 20 percent by weight of the halide (calculated as halide ion).

It is preferred that the temperature of the electro-chemical cell be maintained between 20° and 75°C. At higher temperatures, the current efficiency decreases. The pressure is not critical, and thus atmospheric pressure may be applied. Higher or lower pressures, for instance between 0.5 and 10 atmospheres are also suitable.

The current density of the anode may range preferably between 300 and 5000 A/m$^2$. The terminal voltage results from the selected current density, cell structure and other reaction conditions. Materials which are suitable for use as the anode include graphite and platinum. Also, such metals as titanium, tantalum, vanadium and the like, covered with a protective conductive coating consisting of a noble metal such as platinum or iridium or a mixture of noble metals, or of a mixed oxide such as titanium ruthenium oxide, titanium niobium oxide, vanadium ruthenium oxide and the like.

The electric charge passed through the anode chamber per gram-equivalent of cyanide must be sufficient to form a mixture of cyanogen chloride and chlorine. Generally between 2 and 3 Faradays per gram-equivalent of cyanide is sufficient to form cyanogen chloride and chlorine. The amount of chlorine found in the mixture of cyanogen chloride and chlorine removed from the electrolysis zone ranges by preference from 0.1–25 percent by weight based on the cyanogen chloride.

Cyanogen chloride is trimerized into cyanuric chloride in the present invention according to conventional means, preferably in the gas phase. A wide range of catalysts for the trimerization reaction are known as set forth in Netherlands Pat. application No. 7101929, the contents of which are incorporated herein by reference. A preferred catalyst is active carbon. Trimerization is carried out at a temperature from between 220° and 500°C and preferably between 300° and 450°C. It is preferred that the gas to be trimerized be dried prior to entering the trimerization zone.

After trimerization, cyanuric chloride may be separated from the reaction mixture in a number of conventional ways. For instance, the cyanuric chloride may be separated in the form of a solid after desublimation. Alternatively, the chloride may be separated as a solution after the reaction mixture has been washed out with a suitable solvent. The most suitable solvent is carbon tetrachloride, but other solvents including benzene, chloroform, dioxane, acetone or acetonitrile can be used. However, it is preferred to remove the cyanuric chloride in liquid form after condensation. In this latter method, the major portion of residual gases which still contain cyanuric chloride and unconverted cyanogen chloride, chlorine and by-products is mixed with a mixture of fresh cyanogen chloride and chlorine and recycled back to the trimerization zone while the remainder is discharged. If desired, cyanuric chloride, cyanogen chloride and/or chlorine can be recovered from the gas mixture discharged. Of course recycle of the residual gases is not essential. However, when such residual gases are not recycled, it is preferred that the reaction conditions be such that the highest degree of conversion of cyanogen chloride to cyanuric chloride is reached in one passage.

In order to more fully explain the process and apparatus of the present invention, reference is made to the accompanying drawing which is a schematic representation of the process according to the present invention. In an apparatus described according to this figure, the process according to the present invention can be effected in a continuous manner.

Solid sodium chloride is supplied via line 1 to solution vessel 2 whereby it is dissolved by a return-flow supplied through line 10. A 25.7 percent by weight aqueous sodium chloride solution flows through line 3 to absorber 4, into which gaseous hydrogen cyanide is fed via line 5. Line 43 is not in use. In 4, the hydrogen cyanide is dissolved in the sodium chloride solution to form a solution which contains 3 percent by weight of hydrogen cyanide. This solution flows through line 6 to the anode chambers *a* of the electro-chemical cells 7 (four of which have been drawn). Each anode *a* compartment is separated from the corresponding cathode chamber *b* by a selective cation-permeable membrane (commercially available under the name of AMF-C 311 from the American Machine & Foundry Company). The anode consists of carbon, and the cathode of steel wool. The pH in the anode chamber is set and maintained at approximately 1. The current density at the anode amounts to 1500 A/m$^2$; the bath voltage is about 4 Volts. The temperature in the electro-chemical cell is kept at approximately 20°C. The pressure amounts to 1 atmosphere. 2.05 Faradays of electric charge per gram-equivalent of cyanide passing through the anode chamber are passed through.

A gas/liquid mixture leaves the anode chamber *a* via 8 and is separated in separator 9 into a liquid phase and a gas phase. The liquid phase consists mainly of an aqueous sodium chloride solution which is returned to the solution vessel 2 through line 10. The gas phase flows through line 11 to a gas drier 12 wherein the gas is stripped of water vapour with the aid of a desiccant, namely calcium chloride. The gas upon drying consists of cyanogen chloride, containing 0.3 percent by weight of chlorine. The gas flows then through line 13, through heat exchanger 14, and on through line 15 to the trimerization reactor 16 while simultaneously being mixed with a return-flow supplied via line 22. The mixture fed to the trimerization reactor contains 70 percent by weight cyanogen chloride, 24 percent by weight cyanuric chloride, and 4 percent by weight of chlorine. Carbon is employed as a catalyst for the trimerization reaction. The temperature in reactor 16 is maintained at 430°C and the product mixture is withdrawn from the reactor through 17 and exchanges heat in the exchanger 14 with the reaction mixture flowing to reactor 16. Subsequently, the reaction product is cooled with water to 150°C in a cooler 18 thereby producing steam and resulting in the condensation of cyanuric chloride. The product then flows to separator 20 wherein the liquid cyanuric chloride is separated from the gas phase. 97 percent of the gas phase withdrawn from separator 20 is passed through line 22 and returned to the trimerization reactor through lines 24 and 15. The remaining 3 percent of the gas phase is discharged through line 23.

The cyanuric chloride product is removed from the apparatus through line 21. In the above example, approximately 0.27 kg of cyanuric chloride is obtained per kilowatt hour of electricity employed.

A gas/liquid mixture flows from the cathode chambers *b* to separator 32 through line 31. Here the gas (hydrogen) is separated off and subsequently discharged at 33 as a by-product. The liquid phase consists of a practically saturated solution of sodium hydroxide. A portion of this solution corresponding with the production of sodium hydroxide in the electro-chemical cell is recovered through line 34 as a by-product. The remainder is diluted as necessary in mixer 36 with water supplied via line 37, and returned through line 38, cooler 39, and line 40 to the cathode compartments of the electro-chemical cells. A part may also be supplied to absorber 4 through line 41, cooler 42, and line 43, in order to facilitate the absorption of hydrogen cyanide. This is advantageous in that the neutralization heat is liberated outside the electro-chemical cell and, if desired, can be removed in line 6 in a simple manner, for instance with the aid of a non-drawn cooler. This provides important technological advantages, since the heat produced in the electro-chemical cell can only be removed from the cell with much difficulty.

The invention in its broader aspect is not limited to the specific details shown and described, but departures may be made from such details within the scope of the accompanying claims without departing from the principles of the invention.

What is claimed is:

1. In a process for the preparation of cyanuric chloride wherein cyanogen chloride is trimerized in the presence of chlorine, the improvement which comprises:
    a. electrolytically reacting a solution of hydrogen cyanide or a salt thereof with chloride ion in the anode chamber of an electrolytic cell having separate cathode and anode chambers, the pH in said anode chamber being kept below 4 to form cyanogen chloride;
    b. separating said cyanogen chloride from the electrolyzed solution;
    c. preparing a mixture of said separated cyanogen chloride with chlorine; and
    d. feeding the mixture of cyanogen chloride and chlorine to a trimerization zone wherein said cyanogen chloride is trimerized.

2. The process according to claim 1, wherein step (a) is effected under such conditions whereby chlorine-containing cyanogen chloride is formed and said chlorine-containing cyanogen chloride is fed to the trimerization zone without added chlorine.

3. The process of claim 2, wherein from 2–3 Faradays of electric charge per gram-equivalent of cyanide are passed through the anode chamber.

* * * * *